(12) United States Patent
Suresh et al.

(10) Patent No.: US 12,335,855 B2
(45) Date of Patent: Jun. 17, 2025

(54) CENTRALIZED SERVICE DISCOVERY MANAGEMENT

(71) Applicant: Hewlett Packard Enterprise Development LP, Houston, TX (US)

(72) Inventors: Swetha Nandyalam Suresh, Karnataka (IN); Shanmuga Mari Shanmugam, Karnataka (IN); Mahesh Venkateshwaran, Karnataka (IN); Shreekanth Hiremath, Karnataka (IN); Rakesh Kadur Ramesh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 325 days.

(21) Appl. No.: 17/813,962

(22) Filed: Jul. 21, 2022

(65) Prior Publication Data

US 2024/0031923 A1  Jan. 25, 2024

(51) Int. Cl.
| | |
|---|---|
| *H04B 17/318* | (2015.01) |
| *H04W 24/10* | (2009.01) |
| *H04W 48/18* | (2009.01) |
| *H04W 76/10* | (2018.01) |
| *H04W 88/10* | (2009.01) |

(52) U.S. Cl.
CPC ......... *H04W 48/18* (2013.01); *H04B 17/318* (2015.01); *H04W 24/10* (2013.01); *H04W 76/10* (2018.02); *H04W 88/10* (2013.01)

(58) Field of Classification Search
None
See application file for complete search history.

(56) References Cited

U.S. PATENT DOCUMENTS

| | | | |
|---|---|---|---|
| 9,417,831 B2 | 8/2016 | Evans et al. | |
| 2006/0171403 A1* | 8/2006 | Kim | H04W 84/22 370/410 |

(Continued)

OTHER PUBLICATIONS

Aruba Networks; "Enabling AirPrint and AirPlay on your Network", Mar. 2014, 55 pages.

(Continued)

*Primary Examiner* — Benjamin Lamont
(74) *Attorney, Agent, or Firm* — Hewlett Packard Enterprise Patent Department

(57) ABSTRACT

Examples described herein relate to a centralized service discovery management (CSDM) system and method for distributing service discovery records to access points (APs). The CSDM system receives a service discovery record from a source AP of a plurality of APs deployed in an information technology (IT) infrastructure. The CSDM system is deployed outside the IT infrastructure. The service discovery record comprises information about an application server. Further, the CSDM system generates a neighbor AP group for the application server based on nearness between the source AP and the rest of the plurality of APs, wherein the neighbor AP group includes a set of neighbor APs identified from the plurality of APs. Moreover, the CSDM system transmits the service discovery record to the set of neighbor APs so that the application server is discoverable by client devices connected to the set of neighbor APs.

14 Claims, 5 Drawing Sheets

(56) References Cited

U.S. PATENT DOCUMENTS

| | | | | |
|---|---|---|---|---|
| 2007/0086380 | A1* | 4/2007 | Lim | H04L 12/1877 370/535 |
| 2008/0132264 | A1* | 6/2008 | Krishnamurthy | H04W 52/46 455/522 |
| 2011/0151840 | A1* | 6/2011 | Gong | G06Q 30/0267 455/414.1 |
| 2011/0201369 | A1* | 8/2011 | Kim | H04W 8/00 455/507 |
| 2014/0010150 | A1* | 1/2014 | Agarwal | H04W 4/02 370/328 |
| 2015/0256404 | A1* | 9/2015 | Evans | G06F 3/1288 709/224 |
| 2016/0050684 | A1* | 2/2016 | Ni | H04W 72/12 370/329 |
| 2018/0375731 | A1* | 12/2018 | Kachalia | H04L 41/0886 |
| 2019/0044630 | A1* | 2/2019 | Ferreira | G06F 3/1238 |
| 2021/0099928 | A1* | 4/2021 | Wang | H04W 36/00837 |
| 2021/0160125 | A1* | 5/2021 | Cheng | G06N 20/00 |
| 2021/0344642 | A1* | 11/2021 | Cui | H04L 61/4511 |
| 2023/0056412 | A1* | 2/2023 | Cabrol | H04B 17/327 |

OTHER PUBLICATIONS

Aruba, "RF and Roaming Optimization for Aruba 802.11ac Networks", Hewlett Packard Enterprise Development LP,2019, 36 pages.

Cisco; "DNA Service for Bonjour Configuration Guide, Cisco IOS XE Gibraltar 16.11.x (Catalyst 9300 Switches)", Jun. 16, 2021, 16 pages.

Dell, "Dell Networking W-Series Instant Access Point 6.3.1 .1-4.0", Aruba Networks, 2013, 333 Pages.

* cited by examiner

CENTRALIZED SERVICE DISCOVERY MANAGEMENT

BACKGROUND

Zero-configuration networking techniques (e.g., the Bonjour® protocol) are generally designed for flat, single Layer-2 broadcast domain (e.g., single virtual local area network (VLAN)) such as wireless networking at home and are mostly used by wireless clients and/or application servers. In small-scale information technology (IT) infrastructures such as a home network, the number of network devices (e.g., access points and client devices such as computers, smartphones, etc.) and application servers such as multi-function devices (e.g., printers), multi-media device, a camera, and display devices (e.g., televisions, projectors, etc.) are fewer and are generally installed in a small area. The Bonjour® protocol allows the discovery of all application servers across entire such small-scale IT infrastructure and makes them available to the client devices in the small-scale IT infrastructure whenever a network service discovery request is made by the client devices. Accordingly, users of the client devices in such a small-scale IT infrastructure can find discovered application servers in order to use the services offered by these application servers. As will be understood, since there are generally fewer application servers in the small-scale IT infrastructure (such as the home network), and the geographic space occupied by the small-scale IT infrastructure is relatively small, it is useful to make all the application servers available for use in the entire such small-scale IT infrastructure.

On the other hand, large-scale IT infrastructures, such as computer networks implemented in universities and enterprise setups, often include several access points (APs) spread over multiple locations (e.g., different buildings, floors, rooms, etc.) but connected in in a same Layer-2 broadcast domain (e.g., in the same VLAN). Moreover, in some implementations of such large-scale IT infrastructure, the APs may be distributed across multiple VLANs.

BRIEF DESCRIPTION OF THE DRAWINGS

Features, aspects, and advantages of the present specification will become better understood when the following detailed description is read with reference to the accompanying drawings in which like characters represent like parts throughout the drawings.

Figure 1:
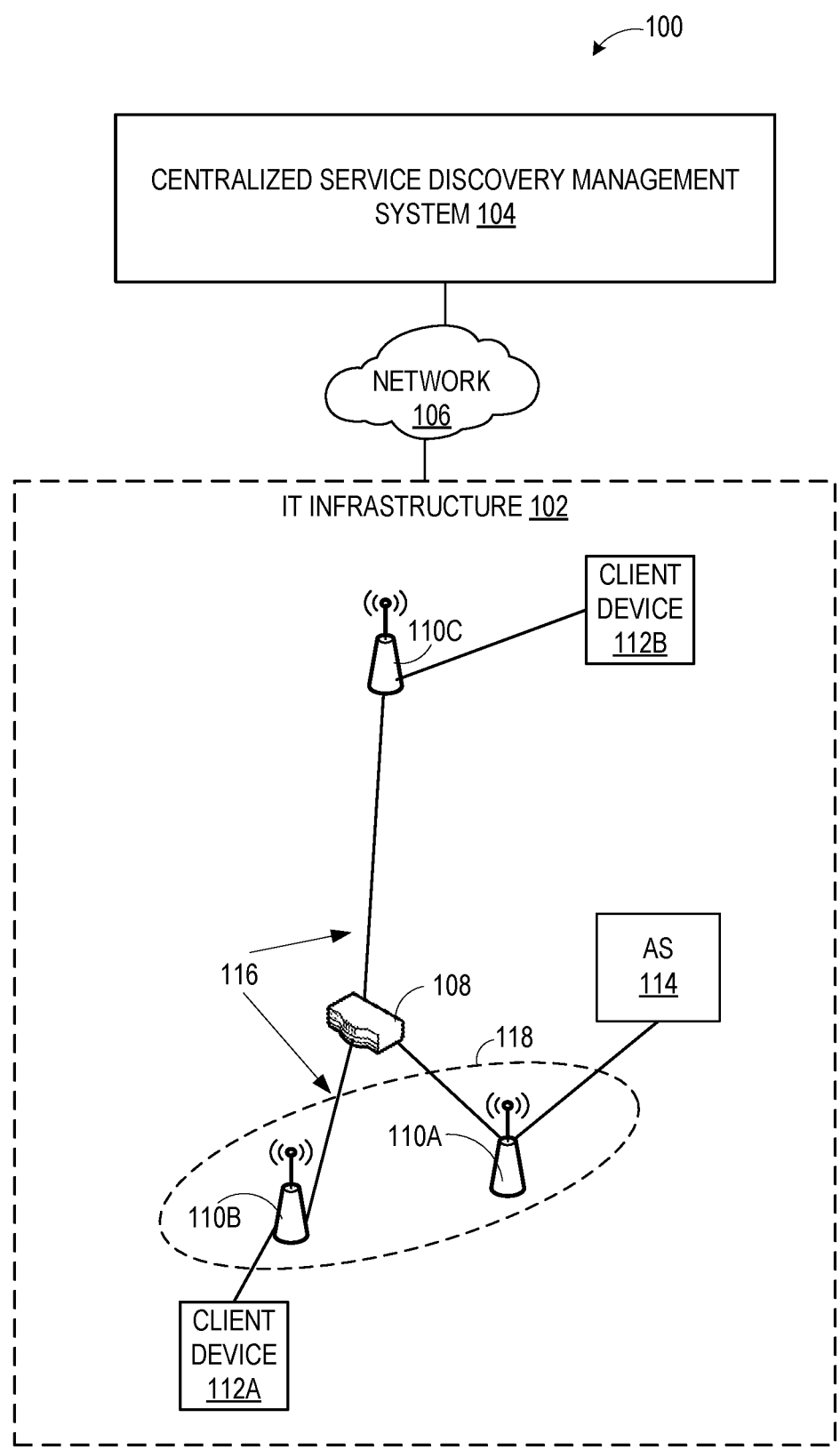
FIG. 1 depicts a system in which various of the examples presented herein may be implemented.

It is emphasized that, in the drawings, various features are not drawn to scale. In fact, in the drawings, the dimensions of the various features have been arbitrarily increased or reduced for clarity of discussion.

DETAILED DESCRIPTION

Certain zero-configuration networking techniques connect network devices to application servers. The application servers may be multi-function devices (e.g., printers), multi-media devices, cameras, display devices (e.g., televisions, projectors, etc.), etc. and can connect with client devices with minimal or no manual intervention. For example, the commonly used Bonjour® protocol allows easy discovery of application servers and the services offered by these application servers without much manual intervention.

Zero-configuration networking techniques that are designed for a small-scale IT infrastructure having a single Layer-2 broadcast domain or VLAN make the application servers available to all client devices connected anywhere in the same Layer-2 broadcast domain/VLAN and thus anywhere in the small-scale IT infrastructure. This is beneficial to the users in such a small-scale IT infrastructure as the manual intervention is minimized. However, even in certain large-scale IT infrastructures that span across multiple buildings, rooms, or floors, the network devices may be connected in the same VLAN. In such an implementation, if the same zero-configuration networking techniques are implemented, a client device may end up discovering application servers that are far from the user's location merely because the application servers are also connected to the same VLAN to which the client device is also connected. For instance, Bonjour® capable application servers will be still discovered by the Bonjour® capable client devices connected to these APs and visible to all the client devices because the APs are connected in the same VLAN. For example, an AppleTV® deployed in a conference room may be available to all users on the same network as that conference room, despite not being near to or using the conference room.

Also, in some cases, Bonjour-capable application servers such as Airprint® could be connected to APs that are located far from each other geographically. In such an implementation, Bonjour-capable client devices will discover all of the Bonjour application servers in the same VLAN. Because the large-scale IT infrastructure may include a large number of Bonjour-capable application devices connected in the same VLAN, a Bonjour-capable client device may discover a huge number of Bonjour-capable application devices, making it difficult for a user to find and interact with the appropriate application device. While the aforementioned examples have been described in relation to the Bonjour protocol, it should be recognized that the examples are not limited to that particular protocol and could work with any appropriate application discovery protocol.

Moreover, in implementations, where the number of application servers is too many, it becomes challenging for the users to find the desired application server or the users may end up choosing the wrong application server, resulting in a poor user experience. Further, in some instances, the chosen application server may be far away from the user's location. This may again worsen the user experience as the user may have to reach the selected application server (e.g., a printer) to obtain the desired service (e.g., printing a document).

In some implementations of such large IT infrastructures, the APs may be distributed across multiple virtual local area networks (VLANs). The zero-configuration networking techniques that are designed for flat, single VLAN cannot discover application servers connected across the VLANs if used in such networks with multiple VLANs. As a result, a client device on a specific VLAN cannot discover an application server that resides on another VLAN although present in the vicinity of the client device. For instance, a user sitting in the same conference room may not be able to discover a projector just because the projector is connected to a different VLAN than the client device of the user. Non-discovery of such a closely located application server may further deteriorate the user experience.

Some existing solutions configure APs in an IT infrastructure such that the Bonjour capable application can be discovered across VLANs. In particular, in such implementations, the APs in the IT infrastructure may form a local AP group. Whenever the APs of such local AP group discover the application servers, every such AP maintains a local device discovery cache including information on discovered application servers. Further, the APs in the local AP group communicate with each other via peer-to-peer communication and exchange the local device discovery caches with each other using which the APs receiving the local device discovery caches create a global device discovery cache. Hence, every AP in the local AP group maintains two caches—one is its local device discovery cache and another is a global device discovery cache.

The APs may then use the global device discovery cache to find application servers for a device discovery request that it receives from a client device. Accordingly, the AP, based on its global device discovery cache, may present a list of already discovered application servers across the VLANs in the network. This solution may function satisfactorily to discover and present application servers distributed across several VLANs served by the APs in the local AP group. However, as will be understood, if the number of application servers in the IT infrastructure is too high, the user may be presented with a large number of application servers, making it difficult for the user to find and interact with the appropriate application device. In particular, the referenced existing solution using the local AP group may be insufficient in overcoming the problems of the user choosing an inappropriate application server (e.g., a wrong application server and/or an application server that is far away from the user's location) because the user may be presented with a large number of application servers.

In accordance with some examples presented herein, a centralized service discovery management (CSDM) system and a method for distributing information of discovered application servers are described that enhance the user experience. The CSDM system may be hosted on a cloud platform outside of the IT infrastructure. In an example consistent with this disclosure, the CSDM system provides a client device with a list of application servers that are near to the client device irrespective of the application servers and the client device connected on different VLANs. This is achieved at least in part as the CSDM system intelligently forms a neighbor AP group including a set of neighbor APs to which the information of discovered application servers is to be distributed. In particular, the CSDM system identifies one or more APs that are near to an AP to which the application server is connected. The AP to which the application server is connected is hereinafter referred to as a source AP.

During operation, the source AP, upon discovery of the application server using service discovery protocol(s), may forward a service discovery record to the CSDM system. The service discovery record may include information, for example, an internet protocol (IP) address of the application server, a media access control (MAC) address of the application server, and a service offered by the application server. Upon receipt of the service discovery record, the CSDM system generates the neighbor AP group including a set of neighbor APs based on the nearness of the rest of the APs in the IT infrastructure with the source AP. In an example consistent with this disclosure, the set of neighbor APs includes APs whose signal strength with the source AP is above a certain threshold level which in turn is indicative of the nearness such as APs with the source AP. Once the neighbor AP group is generated, the CSDM system transmits the service discovery record to the set of neighbor APs that are part of the neighbor AP group. The set of neighbor APs may then update respective device discovery caches with the received service discovery record. Accordingly, when a client device connected to a given neighbor AP of the neighbor AP group requests an application server, the given neighbor AP uses its device discovery cache to identify a suitable application server.

As will be appreciated, the example CSDM system allows enhanced control over device discovery by the client devices. In particular, in an example consistent with this disclosure, with the proposed enhanced distribution of the service discovery records, the application servers may be made discoverable via the APs that are near to the source AP. Accordingly, the client devices will not be presented with a huge list of application servers including ones that are distantly located. Also, with this enhanced distribution of the service discovery records, client devices may be able to discover application servers across different VLANs but are near to the AP to which these client devices are connected. Further, as the neighbor AP group may be dynamically determined by the CSDM system, the client devices can roam easily in the IT infrastructure but can discover application servers that are nearby thereby reducing overall effort in locating the application servers. Furthermore, the techniques described herein greatly reduce manual efforts in configuring location-based services. Overall, the enhanced distribution of the service discovery records of discovered application servers results in displaying relevant and nearby application servers to the client devices thereby greatly improving user experience.

Further, in an example consistent with this disclosure, the CSDM system allows an administrator of a given application server to control a range in which the application server is made discoverable. In particular, in some examples, the administrator may be able to define different ranges for different application servers. Accordingly, the CSDM system may generate different neighbor AP groups for different application servers. Advantageously, a more geographically restricted neighbor AP group may be defined for a projector/ AppleTV as compared to a printer, so that a client device in a given conference room can discover only the projector that is installed in the given conference room, however, can discover all the printers that are located on the same floor.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented for any setup for example, in a home setup or an organization, such as a business, educational institution, governmental entity, healthcare facility, or other organization. The system 100 may include an IT infrastructure 102 and a CSDM system 104. The CSDM system 104 may be hosted outside of the IT infrastructure 102, for example, on a cloud platform. The CSDM system 104 may aid in managing the discovery of application servers in the IT infrastructure 102, as will be described later in the description. The CSDM system 104 and the IT infrastructure 102 may communicate with each other via a network 106.

The network 106 may be a public or private network, such as the Internet, or another communication network to allow connectivity between the IT infrastructure 102 and the CSDM system 104. The network 106 may include third-party telecommunication lines, such as phone lines, broadcast coaxial cable, fiber optic cables, satellite communications, cellular communications, and the like. In some examples, the network 106 may include any number of intermediate network devices, such as switches, routers, gateways, servers, and/or controllers, which are not directly part of the IT infrastructure 102 but that facilitate communication between the various parts of the IT infrastructure 102, and between the IT infrastructure 102 and any other network-connected entities.

In some examples, the IT infrastructure 102 may be of a small-scale (e.g., home network hosting a small number of network devices) or of a large-scale (e.g., an organizational/university/office level hosting a large number of network devices). The IT infrastructure 102 as well may span across more than one site, for example, a room, a floor of a building, a building, or any other space that can host network devices. The IT infrastructure 102 may be a private network, such as a network that may include security and access controls to restrict access to authorized users of the private network. Authorized users may include, for example, employees of a company at the IT infrastructure 102, residents of a house, customers at a business, and the like.

The IT infrastructure 102 may include network devices, for example, several access points (APs), client devices, application servers, and any additional devices that enable the APs and the client devices to communicate with each other and with any external device or system. For illustration purposes, the IT infrastructure 102 of FIG. 1 is shown to include three APs 110A, 110B, and 110C (hereinafter collectively referred to as APs 110A-110C), two client devices 112A and 112B, and an application server 114. It is to be noted that the examples presented herein are not limited by specifics (e.g., types and counts) of the network devices depicted in FIG. 1. In the IT infrastructure 102, the network devices may be connected in the same VLAN or may be distributed among several VLANs, without limiting the scope of the examples described herein.

Further, in some examples, the IT infrastructure 102 may, optionally, include a controller 108 that is in communication with the network 106. The controller 108 may provide communication with the network 106 for the IT infrastructure 102, though it may not be the only point of communication with the network 106 for the IT infrastructure 102. In some examples, the controller 108 may communicate with the network 106 through a router (not shown). In other implementations, the controller 108 may provide router functionality to the devices in the IT infrastructure 102. In some examples, the controller 108 may be a wireless local area network (WLAN) controller. The controller 108 may be operable to configure and manage network devices, such as at the IT infrastructure 102, and may also manage network devices at other remote sites, if any, within the IT infrastructure 102. The controller 108 may be operable to configure and/or manage switches, routers, access points, and/or client devices connected to a network. The controller 108 may itself be, or provide the functionality of, an access point (AP).

Using a connection to the controller 108 or one or more of the APs 110A-100C, one or more of the client devices 112A-112B may access network resources, for example, the application server 114. Examples of client devices 110A-110J may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, virtual terminals, video game consoles, virtual assistants, IOT devices, and the like.

Further, in some examples, in the IT infrastructure 102, the APs 110A-110C are included as another example of a point of access to the network established in IT infrastructure 102 for client devices 112A, 112B. Each of APs 110A-110C may be a combination of hardware, software, and/or firmware that is configured to provide wireless network connectivity to client devices 112A, 112B. The APs 110A-110C may communicate with the controller 108 and the network 106 over connections 116, which may be either wired or wireless interfaces.

Furthermore, in some examples, the IT infrastructure 102 may also include one or more application servers, for example, the application server 114. The application server 114 may be any electronic device that offers one or more services to the client devices in the IT infrastructure 102. The services provided by the application server 114 may include but are not limited to, printing, scanning, displaying, announcing, faxing, emailing, remote controlling, and ordering (e.g., food, beverage, stationery, and/or accessories ordering). Examples of the application server 114 may include but are not limited to, multifunction devices such as printers, scanners, multi-media device, a camera, facsimile machines; vending machines; or displays such as projectors, screens, televisions, and the like. In one example, the application server 114 may be a printer configured with Airprint® service. In another example, the application server 114 may be an AppleTV configured with AIrPlay® service.

The APs 110A-110C, the client devices 112A, 112B and/or the application server 114 may be compliant with one or more of multicast Domain Name System (mDNS) protocol, Simple Service Discovery Protocol (SSDP), or Bonjour protocol. In some examples, zero-configuration networking techniques using one or more of such protocols may allow easy connection, configuration, and utilization of application servers (e.g., the application server 114) in the IT infrastructure 102. For example, the APs 110A-110C, the client devices 112A, 112B and/or the application server 114 may be configured with a commonly used Bonjour® protocol to allow easy discovery of the application server 114 and the services offered by the application server 114 without much manual intervention. Bonjour capable client devices (e.g., the client devices 112A and 112B) can discover Bonjour capable application servers (e.g., the application server 114) and use Bonjour® services (e.g., Airprint®, AirPlay®, etc.). Bonjour uses the mDNS protocol to locate application servers and the services offered by these application servers.

In some examples, the application server 114 may advertise its capabilities when the application server 114 is deployed in the IT infrastructure 102 by way of its connection (e.g., wireless association or wired connection) with an AP, for example, the AP 110A. The AP, for example, the AP 110A, to which the application server 114 is connected is hereinafter referred to as a source AP (e.g., the source AP 110A). The capabilities advertised by the application server 114 may include information about services (e.g., printing, scanning, displaying, announcing, faxing, emailing, remote controlling, and ordering) that the application server 114 can provide the client devices in the IT infrastructure 102. On receiving such advertisement by the source AP 110A, the application server 114 is said to be discovered by the source AP 110A. Once discovered, the source AP 110A stores information about the application server 114 in its local device discovery database, sometimes, as referred to as a local device discovery cache.

Further, in some examples, the source AP 110A may be configured to transmit a service discovery record corresponding to the application server 114 to the CSDM system 104. The service discovery record may include information, for example, an internet protocol (IP) address of the application server, a media access control (MAC) address of the application server, and a service (or services) offered by the application server 114. In some examples, the source AP 110A may communicate the service discovery record to the CSDM system 104 via the controller 108 and the network 106.

The CSDM system 104 may be hosted on a network outside the IT infrastructure 102. In some examples, the CSDM system 104 may be deployed on a cloud platform hosted on a public, private, or hybrid cloud outside the IT infrastructure 102. In some examples, the CSDM system 104 may be implemented as one or more computing systems, for example, computers, controllers, servers, or storage systems hosted on a public cloud, a private cloud, or a hybrid cloud. In certain examples, the CSDM system 104 may be an electronic device having a hardware processing resource (see FIG. 5, for example), such as one or more central processing units (CPUs), semiconductor-based microprocessors, and/or other hardware devices suitable for retrieval and execution of instructions stored in a machine-readable storage medium (see FIG. 5, for example). In certain other examples, the CSDM system 104 may be implemented as a software resource, such as, but not limited to, a software application, a virtual machine (VM), a container, a containerized application, or a pod. In some examples, the CSDM system 104 may be implemented as a service running on a "cloud computing" environment or as a "software as a service" (SaaS). The CSDM system 104 may be offered as a stand-alone product, a packaged solution, and can be utilized on a one-time full product/solution purchase or pay-per-use basis.

Upon receipt of the service discovery record from the source AP 110A, the CSDM system 104 generates a neighbor AP group corresponding to the application server 114. In some examples, the neighbor AP group may include a set of neighbor APs that are identified by the CSDM system 104 based on the nearness of the rest of the APs (e.g., the APs 110B and 110C) in the IT infrastructure 102 with the source AP 110A.

In some examples, the CSDM system 104 may establish the nearness based on wireless signal strength between the source AP and the rest of the APs 110B, 110C. For example, to identify the set of neighbor APs, the CSDM system 104 may request the source AP 110A to provide information on its wireless signal strength with the rest of the APs 110B, 110C. In return, the source AP 110A may provide the wireless signal strength information (e.g., in the form of average received signal strength indicator (RSSI) values) to the CSDM system 104. Accordingly, the CSDM system 104 designates APs whose signal strength with the source AP 110A is above a threshold value (e.g., an RSSI threshold) as the neighbor APs. The signal strength with the source AP being above the threshold value may be indicative of the nearness between the source AP 110A and the rest of the APs 110B, 110C. In some examples, the threshold value used for comparing the signal strengths may be a configurable parameter. An example method of generating the neighbor AP group is described in conjunction with a method of FIG. 4.

In certain other examples, the CSDM system 104 may establish the nearness based on location information of the APs 110A-110C. In order to establish the nearness based on location information, the CSDM system 104 may maintain location data about the APs 110A-110C. The location data may include location coordinates (e.g., one or more of longitude, latitude, or altitude) of the APs 110A-110C. The location coordinates of the APs 110A-110C may be obtained from a global positioning system (GPS) sensor deployed in the respective APs 110A-110C or may be manually provided. In certain other examples, the location information of the APs 110A-110C may be expressed as other types of location identifiers such as but not limited to a room identifier, a cubical identifier, a floor identifier, or the like. Accordingly, in some examples, the CSDM system 104 may use such location information to identify APs that are within a predefined range/area around the source AP 110A. In some examples, the area may be represented as circular region of a predefined radius with the source AP 110A being at the center. The predefined radius may be a configurable value. The APs that are present in the predefined area around the source AP 110A may be identified as the neighbor APs of the source AP 110A for the application server 114.

In some examples, if there are more than one application server in an IT infrastructure (see FIG. 2), it is also possible for an administrator to define different threshold values or radius/range for the different application servers. Accordingly, it is also possible that a set of neighbor APs identified for one application server may be different from a set of neighbor APs identified for another application server. In some examples, the different neighbor AP groups may have certain common neighbor APs.

The CSDM system 104 may designate an AP as a neighbor AP based on its nearness to the source AP 110A. For example, if a wireless signal strength between the source AP 110A and the AP 110B is identified to be greater than the threshold value or is located within a predefined range from the source AP 110A, the CSDM system 104 may designate the AP 110B as the neighbor AP. Designating an AP as a neighbor AP may include creating an entry in a neighbor map for the application server 114. Table-1 presented below represents an example neighbor map for the application server 114.

TABLE 1

Example neighbor map

| Application Server | Source AP | Neighbor AP(s) | Neighbor AP Group |
|---|---|---|---|
| Application server 114 | AP 110A | AP 110B | AP 110A, AP 110B |

As depicted in Table-1, a neighbor AP group (marked with a dashed oval 118 in FIG. 1) for the application server 114 may include the source AP and an AP that is designated as a neighbor AP (e.g., the AP 110B in the present example) by the CSDM system 104. In the example implementation of the IT infrastructure 102 of FIG. 1, the AP 110C may be located away (e.g., on a far corner of a large office floor or a different floor of a building) from the source AP 110A such that the wireless signal strength between the source AP 110A and the AP 110C is identified to be lower than the predefined threshold level. Accordingly, the AP 110C may not be designated as a neighbor AP and is not included in the neighbor map for the application server 114.

Once the neighbor AP group is created for the application server 114, the CSDM system 104 may transmit the service discovery record of the application server 114 to the APs, for example, the APs 110A and 110B, that are part of the neighbor AP group. The APs 110A and 110B may then update their respective device discovery databases stored locally in the AP 110B with the received service discovery record of the application server 114. Accordingly, when a client device connected to a given neighbor AP of the neighbor AP group requests an application server, the given neighbor AP uses its device discovery database to identify a suitable application server. For example, if a user that uses the client device 112A requests for a printer to print a document, the client device sends a device discovery query to the AP 110B to which the client device 112A is associated. The device discovery query may be compliant with one or more of multicast Domain Name System (mDNS) protocol, Simple Service Discovery Protocol (SSDP), or Bonjour protocol. Since the AP 110B might already have the service discovery record of the application server 114 stored in its device discovery database, the AP 110B may cause the client device 112A to display the application server 114 (which may be a printer, for example) available to print the user's document. Accordingly, the user may select the application server 114 to print the document.

As such, client devices connected to the APs 110A and 110B that are part of the neighbor AP group can discover the application server 114 as the CSDM system 104 has provided the APs 110A and 110B with the service discovery record of the application server 114. As will be appreciated, because the AP 110B to which the client device 112A is connected and the source AP 110A are identified as neighbors (i.e., located nearby) by the CSDM system 104, the user of the client device 112A can easily locate the application server 114 without a need to go to a location far away from the user's location. This results in an enhanced user experience. Moreover, with such an enhanced distribution of the service discovery records, client devices may be able to discover application servers distributed across different VLANs but are near to the AP to which these client devices are connected.

On the other hand, the client devices (e.g., the client device 112B) connected to the AP 110C will not be able to discover the application server 114 because the AP 110C CSDM system 104 has not sent the service discovery record of the application server 114 to the AP 110C. In particular, a user of the client device 112B connected to the AP 110C will not be presented with the application server 114 (of course, it may discover other application servers (not shown) that are present nearby in a similar fashion as described regarding client device 112A) if the user of the client device 112B initiates a document print request. As will be appreciated, this is beneficial for the user of the client device 112B as it is not presented with application server 114 which is located far from the client device by virtue of application server 114 being connected to the AP 110A which is far away (e.g., on a different floor) from the AP 110C.

Figure 2:
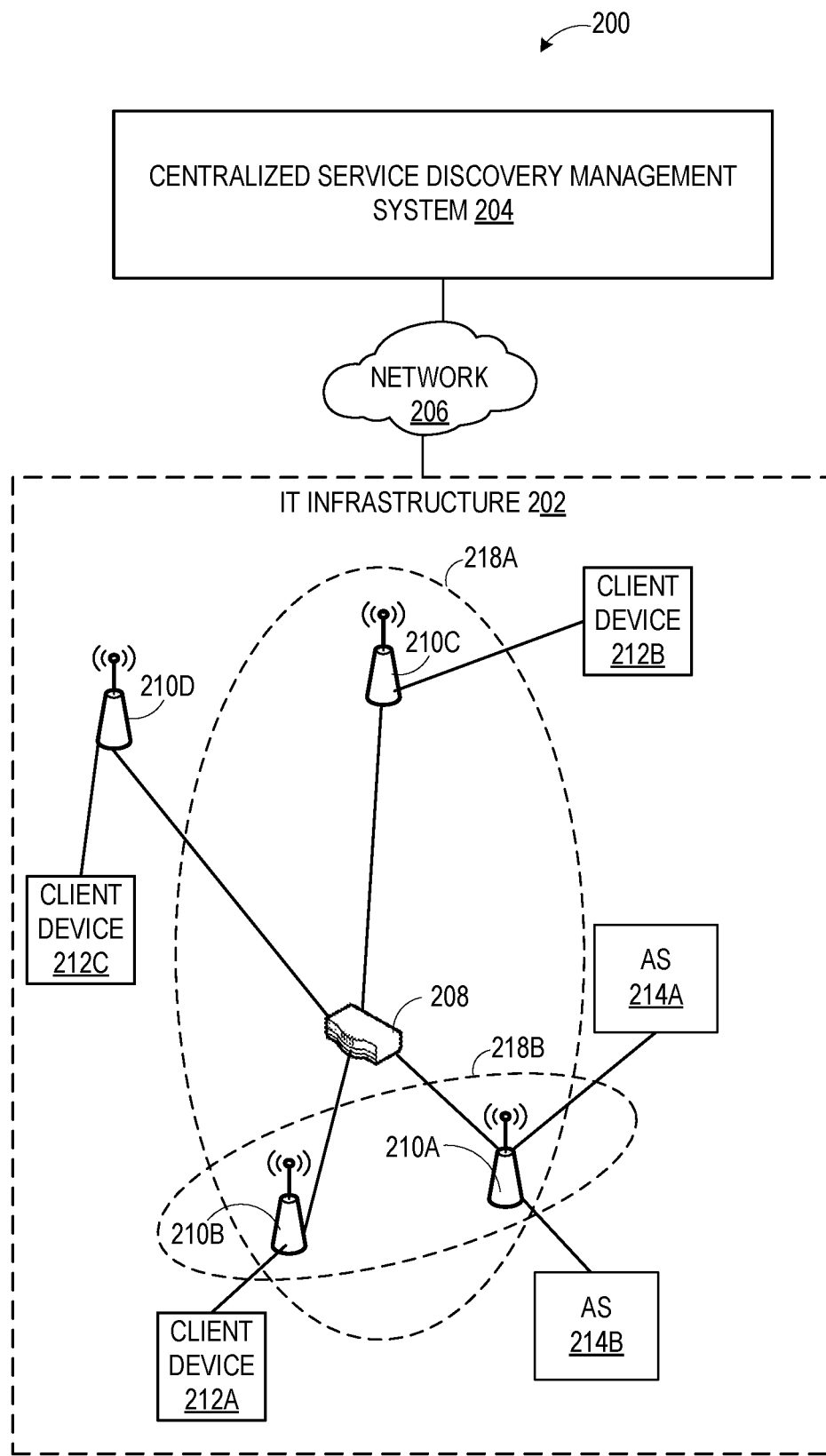
FIG. 2 depicts another system in which various of the examples presented herein may be implemented.

Referring now to FIG. 2, another system 200 is presented in which various of the examples presented herein may be implemented. The system 200 of FIG. 2 may be an example representative of the system 100 of FIG. 1. Accordingly, the system 200 may also be implemented for a home setup or an organization, such as a business, educational institution, governmental entity, healthcare facility, or other organization. The system 200 may also include one or more systems and devices that are example representatives of the systems and devices deployed in the system 100 of FIG. 1, certain description of which is not repeated herein for the sake of brevity. For example, the system 200 may include an IT infrastructure 202 and a CSDM system 204 which are example representatives of the IT infrastructure 102 and the CSDM system 104, respectively, of FIG. 1. The CSDM system 204 may aid in managing the discovery of application servers in the IT infrastructure 202. The CSDM system 204 and the IT infrastructure 202 may communicate with each other via a network 206 which may be an example representative of the network 106 of FIG. 1.

For illustration purposes, the IT infrastructure 202 is shown to include four APs 210A, 2106, 210C, and 210D (hereinafter collectively referred to as APs 210A-210D). In some examples, the APs 210A-210D may be communicatively coupled to a controller 208. Further, the IT infrastructure 202 may include client devices 212A, 212B, and 212C that are communicatively coupled to (e.g., in wireless association with) the APs 2106, 210C, and 210D, respectively. Moreover, the IT infrastructure 202 may include a first application server 214A and a second application server 214B communicatively coupled to the AP 210A. Accordingly, the AP 210A is hereinafter referred to as a source AP. For the purpose of illustration hereinafter, the first application server 214A is described as being a printer located in a printer bay on a floor of a building. Further, for the purpose of illustration hereinafter, the second application server 214B is described as being a display device (e.g., a television, a projector, or a display screen) which may be located in a conference room or in an auditorium adjacent to the printer bay. Also, the APs 210A and 210B may be considered as being deployed inside the same auditorium or the conference room hosting the application server 214B (e.g., the display device). The APs 210C and 210D may be deployed outside of the auditorium or the conference room hosting the application server 214B.

Upon discovering the application servers 214A and 214B, the source AP 210A may transmit service discovery records corresponding to the application servers 214A and 214B to the CSDM system 204. In some examples, the CSDM system 204 receives a first service discovery record including information of the first application server 214A, and a second service discovery record including information of the second application server 214B from the source AP 210A. The information contained in the respective first and second service discovery records may include IP addresses, MAC addresses, and a service (or services) offered by the respective application servers 214A, 214B.

Upon receiving the service discovery records, the CSDM system 204 may generate neighbor AP groups corresponding to the application servers 214A and 214B. For example, the CSDM system 204 may generate a first neighbor AP group corresponding to the first application server based on a first nearness between the source AP 210A and the rest of the plurality of APs 210B-210D. The first neighbor AP group may include a first set of neighbor APs identified from the plurality of APs. Similarly, the CSDM system 204 may generate a second neighbor AP group corresponding to the second application server based on a second nearness between the source AP 210A and the rest of the plurality of APs 210B-210D. The second neighbor AP group includes a second set of neighbor APs identified from the plurality of APs.

In some examples, the CSDM system 204 may determine the first nearness and the second nearness based on common criteria or different criteria corresponding to the application servers 214A and 214B. For example, the CSDM system 204 may be configured to receive signal strength values (e.g., average RSSI values) for wireless signals) between the source AP and each of the rest of the plurality of APs. The signal strength values are indicative of the nearness between the source AP and the rest of the plurality of APs. The CSDM system 204 may use different signal strength thresholds with respect to application servers 214A and 214B against which the CSDM system 204 will compare the signal strength values. In order to generate the first neighbor AP group, the CSDM system 204 may compare signal strengths (e.g., average RSSI values) between the source AP 210A and the rest of the plurality of APs 210B-210D against a first signal strength threshold (e.g., a first RSSI threshold), and APs with which the source AP 210A has signal strength higher than the first signal strength threshold may be identified as the first set of neighbor APs. Likewise, to generate the second neighbor AP group, the CSDM system 204 may compare signal strengths (e.g., the average RSSI values) between the source AP 210A and the rest of the plurality of APs 210B-210D against a second signal strength threshold (e.g., a first RSSI threshold). The APs for which the source AP 210A has signal strength higher than the second signal strength threshold may be identified as the second set of neighbor APs.

In some examples, the first and second signal strength thresholds may be equal. In some examples, the second signal strength threshold may be set to a value higher than the first second signal strength threshold, so that APs that are located far away are not included in the second neighbor AP group, resulting in a limited number of APs discovering the second application server 214B (as will be described later). Table-2 and Table-3 shown below represent example neighbor maps corresponding to the application server 214A and 214B, respectively.

TABLE 2

Example neighbor map for the first application server 214A

| Application Server | Source AP | Neighbor AP(s) | First Neighbor AP Group |
|---|---|---|---|
| Application server 214A | AP 210A | AP 210B AP 210C | AP 210A AP 210B AP 210C |

As depicted in Table-2, the first neighbor AP group (marked with a dashed oval 218A in FIG. 2) for the first application server 214A may include the source AP 210A and the identified neighbor APs 210B and 210C. In the example implementation of the IT infrastructure 202 of FIG. 2, the AP 210D may be located far away from the source AP 210A such that the wireless signal strength between the source AP 210A and the AP 210D is identified to be lower than the first signal strength threshold. Accordingly, the AP 210D may not be designated as a neighbor AP in the context of the first application server 214A and is therefore not included in the neighbor group for the application server 214A.

TABLE 3

Example neighbor map for the second application server 214B

| Application Server | Source AP | Neighbor AP(s) | Second Neighbor AP Group |
|---|---|---|---|
| Application server 214B | AP 210A | AP 210B | AP 210A AP 210B |

As depicted in Table-3, the second neighbor AP group (marked with a dashed oval 218B in FIG. 2) for the second application server 214B may include the source AP 210A and the identified neighbor AP 210B. In the example implementation of the IT infrastructure 202 of FIG. 2, the APs 210C and 210D may be located away from the source AP 210A such that the wireless signal strength between the source AP 210A and each of the APs 210C and 210D is identified to be lower than the second signal strength threshold. Accordingly, the APs 210C and 210D may not be designated as neighbor APs in the context of the second application server 214B and are therefore not included in the neighbor group for the application server 214B. In some examples, the first and second neighbor AP groups may have one or more common APs. For example, as depicted in Table-2 and Table-3, the first and second neighbor AP groups have the AP 210B in common because the signal strength between the AP 210B and the source AP 210A is higher than both the first and second signal strength thresholds.

Once the neighbor AP groups are created for the application servers 214A and 214B, the CSDM system 204 may transmit the service discovery records of the application servers 214A and 214B to the respective sets of neighbor APs. For example, the CSDM system 204 may transmit the first service discovery record to the APs 210A, 2106, and 210C that are part of the first AP group. Accordingly, the APs 210A, 210B, and 210C may store the first service discovery record in respective device discovery databases so that the first application server 214A is discoverable by client devices connected to the first set of neighbor APs. In particular, when a service (e.g., printing) is requested by the client devices 212A and 212B, the client devices 212A and 212B may be able to discover the application server 214A. On the other hand, the client device 212C that is connected to the AP 210D which is not a part of the first neighbor AP group will not be able to discover the first application server 214A when it requests printing a document.

Similarly, the CSDM system 204 may also transmit the second service discovery record to the APs 210A and 210B that are part of the second neighbor AP group. Accordingly, the APs 210A and 210B may store the second service discovery record in respective device discovery databases so that the second application server 214B is discoverable by client devices connected to the APs of the second AP group. In particular, when a service (e.g., displaying content, such as, a presentation or a video) is requested by the client device 212A, the client device 212A may be able to discover the second application server 214B. However, the client devices 212B and 212C that are connected to the APs 210C and 210D, respectively, which are not a part of the second neighbor AP group will not be able to discover the second application server 214B when they request displaying any content.

Figure 3:
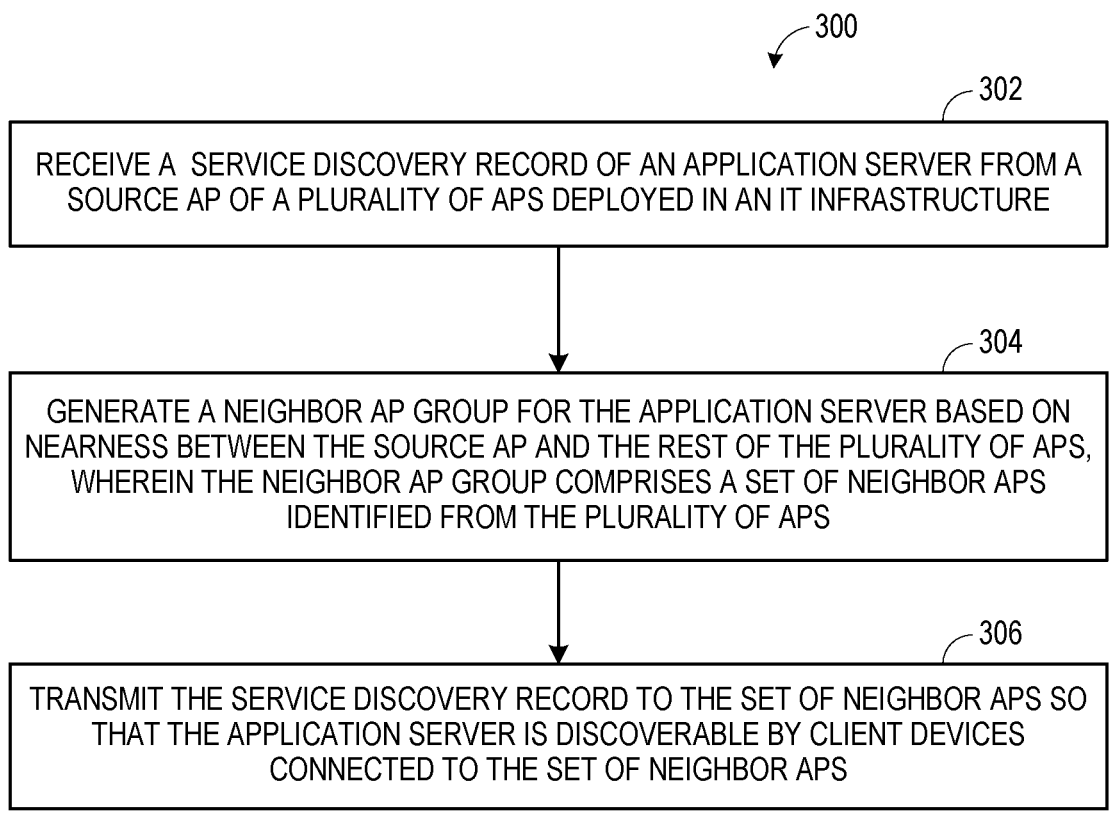
FIG. 3 depicts an example method for distributing information about application servers.
Figure 4:
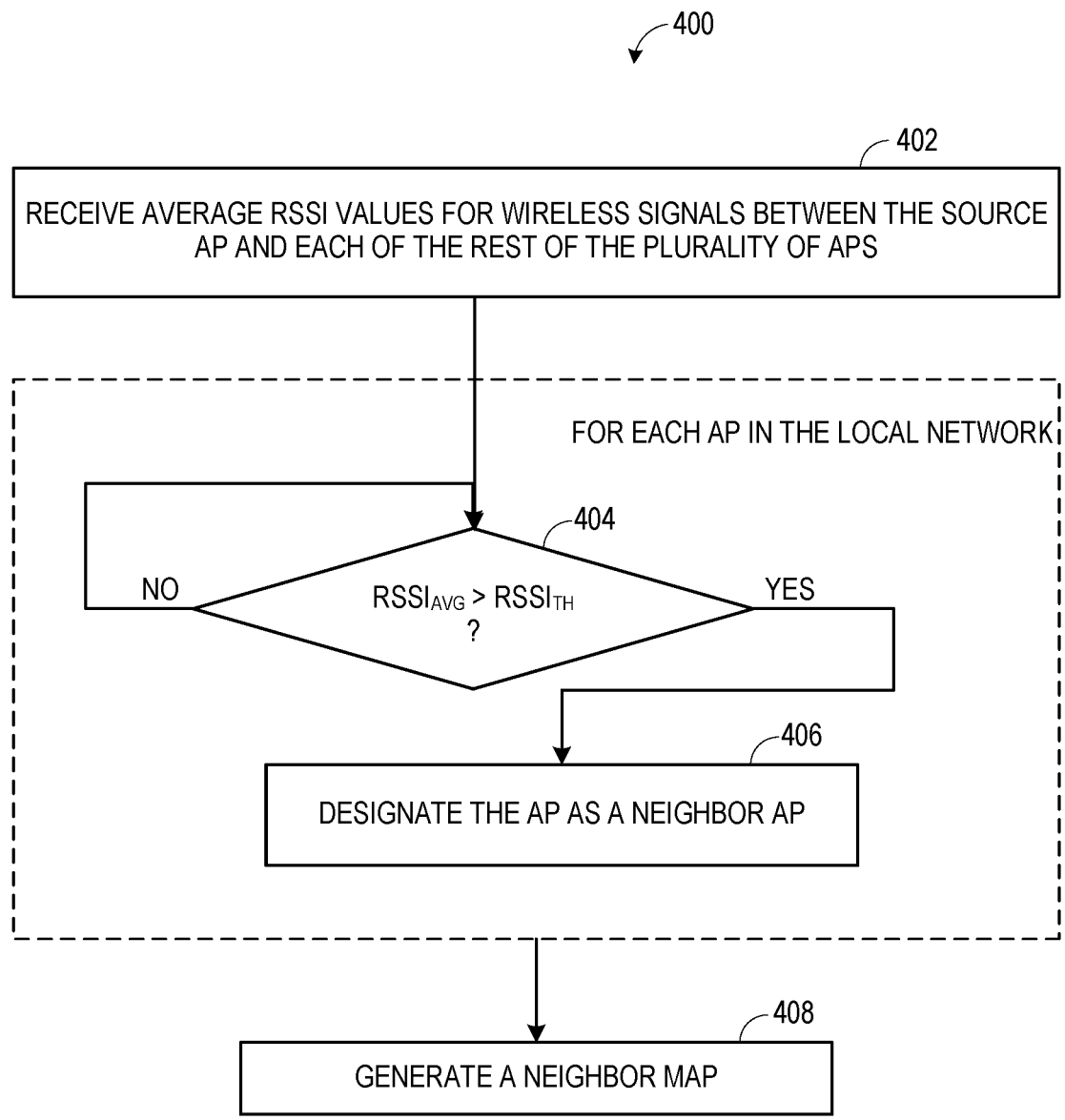
FIG. 4 depicts an example method for generating a neighbor AP group for an application server.

In the description hereinafter, several operations performed by a CSDM system, for example, the CSDM system 104 of FIG. 1, will be described with help of flow diagrams depicted in FIGS. 3 and 4. For illustration purposes, the flow diagrams, depicted in FIGS. 3 and 4, are described in conjunction with the system 100 of FIG. 1, however, the methods of FIGS. 3 and 4 should not be construed to be limited to the example configuration of the system 100, for example, in respect of the types of the network devices and/or the number of network devices depicted in FIG. 1. Also, the methods of FIGS. 3 and 4 may also be applicable to the system 200 of FIG. 2.

Figure 5:
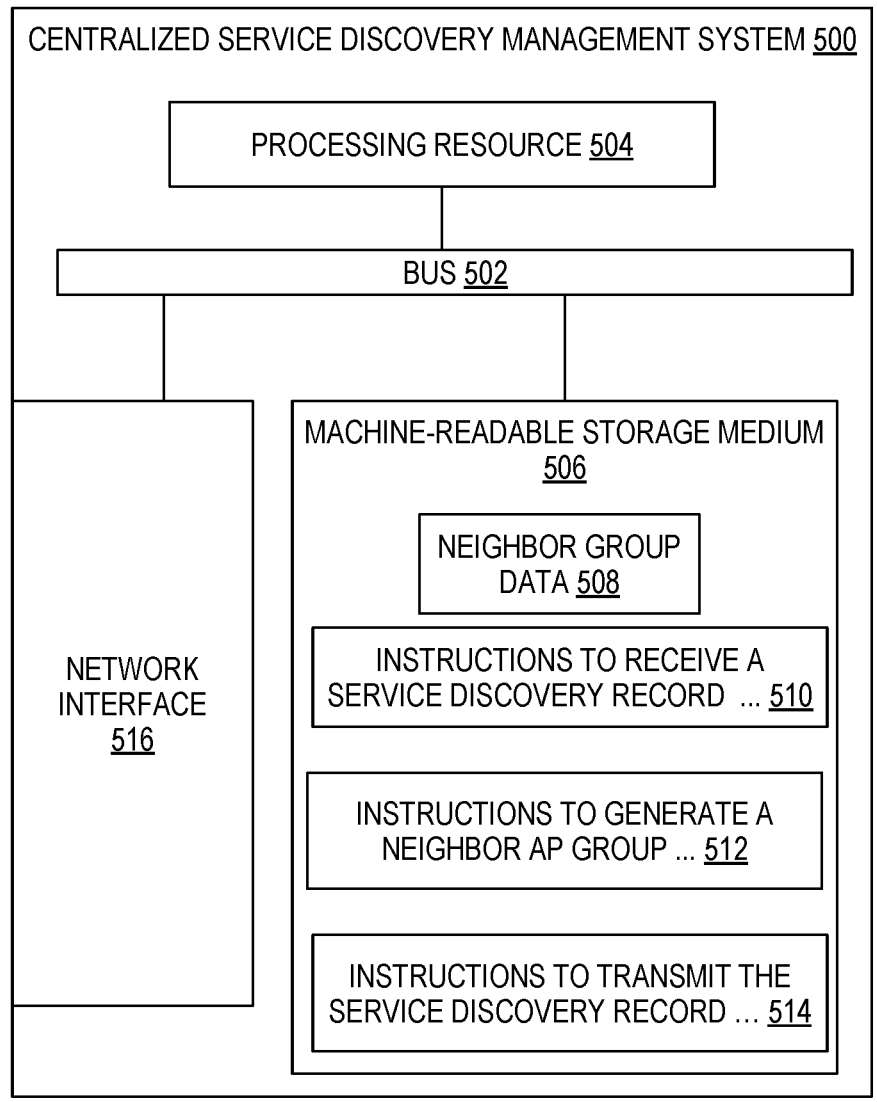
FIG. 5 depicts a block diagram of an example centralized service discovery management (CSDM) system.

The methods described in FIGS. 3 and 4 may include a plurality of blocks, operations at which may be performed by a processor-based (see FIG. 5). In particular, operations at each of the plurality of blocks may be performed by a processing resource such as the processing resource by executing one or more instructions stored in a machine-readable storage medium (see FIG. 5). In particular, the methods described in FIGS. 3 and 4 may represent an example logical flow of some of the several operations performed by the CSDM system 104. However, in some other examples, the order of execution of the blocks depicted in FIGS. 3 and 4 may be different than the order shown. For example, the operations at various blocks may be performed in series, in parallel, or in a series-parallel combination.

Referring now to 3, a flow diagram of an example method 300 for distributing information of discovered application servers is presented. The method 300 may include blocks 302, 304, and 306 (hereinafter collectively referred to as blocks 302-306) that are performed by the CSDM system 104. In certain examples, operations at blocks 302-306 may be performed by the processing resource by executing one or more of the instructions stored in the machine-readable storage medium. Certain details of the operations performed at one or more of blocks 302-306 have already been described in conjunction with FIG. 1, which is not repeated herein for the sake of brevity.

At block 302, the CSDM system 104 may receive a service discovery record from a source AP, for example, the source AP 110A of the plurality of APs deployed in an IT infrastructure, for example the IT infrastructure 102. As described in conjunction with FIG. 1, the service discovery record may include information corresponding to an application server, for example, the application server 114, discovered by the source AP 110. Further, at block 304, the CSDM system 104 generates a neighbor AP group corresponding to the application server 114 based on the nearness between the source AP 110A and the rest of the plurality of APs in the IT infrastructure 102. As previously described, the nearness between the source AP 110A and the rest of the plurality of APs may be determined based on a wireless signal strength between the source AP 110A and the rest of the plurality of APs and/or the location information of the APs in the IT infrastructure 102. In particular, the neighbor AP group may include a set of neighbor APs identified from the plurality of APs in the IT infrastructure 102. In the example implementation of FIG. 1, as previously described, the CSDM system 104 has generated a neighbor AP group for the application server 114 including the source AP 110A and the neighbor AP 110B. An example method of generating a neighbor AP group is described in conjunction with FIG. 4.

Moreover, at block 306, the CSDM system 104 may transmit the service discovery record of the application server 114 to the set of neighbor APs of the neighbor AP group determined at block 304. The set of neighbor APs may store the service discovery record in respective device discovery caches so that the application server 114 is discoverable by client devices connected to the set of neighbor APs. In particular, the client device 112A connected to the AP 110B (i.e., the designated neighbor AP) initiates a print request, the client device 112A may be able to discover the application server 114 as the AP 210B already have information about the application server 114 offering the print service.

Referring now to 4, a flow diagram of an example method 400 for generating a neighbor AP group is presented. The method 400 may include blocks 402, 404, 406, and 408 (hereinafter collectively referred to as blocks 402-408) that are performed by the CSDM system 104. In certain examples, operations at blocks 402-408 may be performed by the processing resource by executing one or more of the instructions stored in the machine-readable storage medium. Certain details of the operations performed at one or more of blocks 402-408 have already been described in conjunction with FIG. 1, which is not repeated herein for the sake of brevity.

At block 402, the CSDM system 104 may receive average received signal strength indicator (RSSI) values for wireless signals between the source AP (e.g., the source AP 110A) and each of the rest of the plurality of APs in the IT infrastructure 102. In some examples, after the CSDM system 104 has received the service discovery record of the application server 114 from the source AP 110A, the CSDM system 104 may request the source AP 110A to send the average RSSI values between the source AP 110A and each of the APs 110B and 110C. In some other examples, all of the APs in the IT infrastructures 102 may be configured to periodically send the average RSSI values with the other APs to the CSDM system 104. The RSSI values may be indicative of the nearness between the source AP and the rest of the plurality of APs. The RSSI values, and are generally expressed as negative values expressed in decibels (dB) with reference to one milliwatt (mW) power, hereinafter referred to as decibel-milliwatts (dBm). Table-4 represented below shows example average RSSI values of wireless signals between the source AP 110A and the other APs in the IT infrastructure 102.

TABLE 4

Example RSSI values

| Source AP | Target AP | Average RSSI Value between the Source AP and the Target AP |
|---|---|---|
| AP 110A | AP 110B | −30 dBm |
| AP 110A | AP 110C | −85 dBm |

Further, in some examples, the CSDM system 104, for each of the rest of the APs (e.g., the APs other than the source AP), may perform a check at block 404, to determine if the respective average RSSI value of wireless signals between the source AP and the AP is greater than an RSSI threshold. In some examples, the RSSI threshold may be a configurable value which may be either a preconfigured value or set by an administrator of the application server 114. In particular, in some examples, the administrator of the application server 114 may specify the RSSI threshold with respect to the application server 114 while setting up/configuring the application server 114. In certain example implements of IT infrastructures, such as the IT infrastructure 202 depicted in FIG. 2, it is also possible to define two different RSSI thresholds, for example, a first RSSI threshold for the first application server 214A and a second RSSI threshold for a second application server 214B. Depending on the type of the application sever different values of RSSI thresholds may be specified. For example, for the second application server 214B which is a display device, the second RSSI threshold may be kept greater than the first RSSI threshold specified for the second application server 214A which may be a printer. Returning now to the example of FIG. 1, for illustration purposes, the value of the RSSI threshold for the application server 114 may be set to −50 dBm, for example.

At block 404, for a given AP, if it is determined that the average RSSI value is greater than or equal to the RSSI threshold for the application server 114, at block 406, the CSDM system 104 may designate the given AP as a neighbor AP. For example, based on the information in Table-4, for the AP 110B, the CSDM system 104 may determine that its average RSSI value (e.g., −30 dBm) is greater than the RSSI threshold of −50 dBm. Accordingly, at block 406, the CSDM system 104 may designate the AP 110B as the neighbor AP. Further, in some examples, the CSDM system 104 may perform the check at block 404 again for another AP of the rest of the APs in the IT infrastructure 102. However, at block 404, if it is determined that the average RSSI value is smaller than the RSSI threshold for the application server 114, the CSDM system 104 may not designate the given AP as a neighbor AP. For example, for the AP 110C, the CSDM system 104 determines that its average RSSI value (e.g., −85 dBm) is smaller than the RSSI threshold of −50 dBm. Accordingly, the CSDM system 104 may not designate the AP 110C as the neighbor AP. Further, in some examples, the CSDM system 104 may perform the check at block 404 again for another AP of the rest of the APs in the IT infrastructure 102.

Once the CSDM system 104 completes the check at block 404 for all the APs in the IT infrastructure 102, the CSDM system 104 is said to have completed generating the neighbor AP group. In some examples, the neighbor AP group may be a collection of APs that the CSDM system 104 designates as neighbor APs at block 406 and the source AP 110A. In some examples, at block 408, the CSDM system 104 may generate a neighbor map corresponding to the application server 114 and store it in a storage device associated with the CSDM system 104.

In case of an example implementation the system 200 of FIG. 2, the CSDM system 104 may also perform similar steps to identify the sets of neighbor APs by performing operations at blocks 404 and 406 separately for each RSSI threshold (e.g., the first RSSI threshold and the second RSSI threshold) to generate two neighbor AP groups, for example, the first neighbor AP group for the first application server 214A and the second neighbor AP group for the second application server 214B.

FIG. 5 depicts a block diagram of an example CSDM system 500 in which various of the examples described herein may be implemented. In some examples, the CSDM system 500 may be configured to operate as any of the CSDM systems 104 or 204, and can perform various operations described in one or more of the earlier drawings.

The CSDM system 500 may include a bus 502 or other communication mechanisms for communicating information (e.g., commands and/or data), a hardware processor, also referred to as processing resource 504, and a machine-readable storage medium 506 coupled to the bus 502 for processing information. In some examples, the machine-readable storage medium 506 may be non-transitory and is alternatively referred to as a non-transitory machine-readable storage medium 506. The machine-readable storage medium 506 may be any electronic, magnetic, optical, or any other storage device that may store data and/or executable instructions. Examples of the machine-readable storage medium 506 may include random access memory (RAM), electrically erasable programmable read-only memory (EEPROM), a storage drive, a flash memory, magnetic disk, a compact disc read-only memory (CD-ROM), and the like.

The machine-readable storage medium 506 may store data and/or instructions. For example, the machine-readable storage medium 506 may store neighbor group data 508. The neighbor group data 508 may be an example representative of neighbor maps such as information represented in one or more of Table-1, Table-2, and Table-3 described earlier. The instructions encoded in the machine-readable storage medium 506 may include instructions 510, 512, and 514 (hereinafter collectively referred to as instructions 510-514) for performing the method 300 described in FIG. 3, for example. Although not shown, in some examples, the machine-readable storage medium 506 may be encoded with certain additional executable instructions to perform any other operations performed by the CSDM system 104 or 204, without limiting the scope of the present disclosure.

In some examples, the processing resource 504 may include one or more central processing units (CPUs), semiconductor-based microprocessors, and/or other hardware devices suitable for retrieval and execution of instructions 510-514 stored in a machine-readable storage medium 506. The processing resource 504 may fetch, decode, and execute instructions 510-514, to manage the distribution of service discovery records to APs deployed in an IT infrastructure (e.g., IT infrastructures 102, 202). As an alternative or in addition to retrieving and executing instructions 510-514, the processing resource 504 may include one or more electronic circuits that include electronic components, such as, a field-programmable gate array (FPGA), an application-specific integrated circuit (ASIC), or other electronic circuits for performing the functionality of one or more instructions 510-514. In some examples, when the CSDM system 500 is implemented as a virtual resource (e.g., a VM, a container, or a software application), the processing resource 504 and the machine-readable storage medium 506 may respectively represent a processing resource and a machine-readable storage medium of a host system hosting the CSDM system 500 as the virtual resource.

Further, in some examples, the CSDM system 500 may also include a network interface 516 coupled to bus 502. The network interface 516 provides a two-way data communication coupling to one or more network links that are connected to one or more network (e.g., the network 106, 206). For example, the network interface 516 may be an integrated services digital network (ISDN) card, cable modem, satellite modem, or a modem to provide a data communication connection to a corresponding type of telephone line. As another example, the network interface 516 may be a local area network (LAN) card or a wireless communication unit (e.g., Wi-Fi chip/module).

In some examples, the instructions 510-514 when executed by the processing resource 504 may cause the processing resource 504 to manage the distribution of the service discovery records of application servers deployed in the IT infrastructure such that the application servers can be discovered by appropriate client devices and the client devices will not be presented with a huge list of application servers to choose from. For example, the instructions 510, when executed by the processing resource 504, may cause the processing resource 504 to receive a service discovery record from a source AP (e.g., the AP 110A) of a plurality of APs deployed in an IT infrastructure (e.g., the IT infrastructure 102), wherein the service discovery record comprises information corresponding to an application server (e.g., the application server 114). Further, the instructions 512, when executed by the processing resource 504, may cause the processing resource 504 to generate a neighbor AP group corresponding to the application server based on nearness between the source AP and the rest of the plurality of APs. The neighbor AP group may include a set of neighbor APs identified from the plurality of APs in the IT infrastructure. Moreover, the instructions 514, when executed by the processing resource 504, may cause the processing resource 504 to transmit the service discovery record to the set of neighbor APs so that the application server is discoverable by client devices connected to the set of neighbor APs.

Although not shown in FIG. 5, in some examples, the machine-readable storage medium 506 may also be encoded with additional executable instructions to perform the method blocks described in FIG. 4 to generate the neighbor AP group. Furthermore, in some examples, the machine-readable storage medium 506 may also be encoded with additional executable instructions to perform one or more operations described in conjunction with FIG. 2.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. The term "based on" means based at least in part on.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method, comprising:
   receiving, by a centralized service discovery management (CSDM) system, a service discovery record from a source access point (AP) of a plurality of APs deployed in an information technology (IT) infrastructure, wherein the CSDM system is deployed outside the IT infrastructure, and wherein the service discovery record comprises information about an application server;
   generating, by the CSDM system, a neighbor AP group for the application server based on nearness between the source AP and the rest of the plurality of APs, wherein the neighbor AP group comprises a set of neighbor APs identified from the plurality of APs such that an average received signal strength indicator (RSSI) value for wireless signals between each of the set of neighbor APs and the source AP is greater than an RSSI threshold; and
   transmitting, by the CSDM system, the service discovery record to the set of neighbor APs so that the application server is discoverable by a first client device connected to the set of neighbor APs that are part of the neighbor AP group but not discoverable by a second client device connected to one or more APs that are not in neighbor AP group for the application server.

2. The method of claim 1, wherein generating the neighbor AP group comprises receiving, by the CSDM system from the source AP, the average RSSI value for wireless signals between the source AP and the each of the rest of the plurality of APs, wherein the average RSSI value is values are indicative of the nearness between the source AP and the rest of the plurality of APs.

3. The method of claim 2, wherein generating the neighbor AP group further comprises:
   for an AP of the plurality of APs,
      determining if the average RSSI value of wireless signals between the source AP and the AP is greater than the RSSI threshold; and
      designating, by the CSDM system, the AP as a neighbor AP if the average RSSI value of wireless signals between the source AP and the AP is greater than the RSSI threshold.

4. The method of claim 3, wherein the RSSI threshold is configurable.

5. The method of claim 1, wherein the application server is discovered by the source AP, and wherein the application server comprises one or more of a multi-function device, a multi-media device, a camera, a projector, or a computer running a specific service.

6. The method of claim 1, wherein the application server is discovered by the source AP and the neighbor AP by sending a device discovery query compliant with one or more of multicast Domain Name System (mDNS) protocol, Simple Service Discovery Protocol (SSDP), or Bonjour protocol.

7. The method of claim 1, wherein the CSDM system is hosted on a cloud platform and communicatively coupled to the IT infrastructure via the Internet.

8. The method of claim 1, wherein the service discovery record comprises one or more of an internet protocol (IP) address of the application server, media access control (MAC) address of the application server, or a service offered by the application server.

9. A centralized service discovery management (CSDM) system, comprising:
- a machine-readable storage medium storing executable instructions; and
- a processing resource coupled to the machine-readable storage medium, wherein the processing resource executes one or more of the instructions to:
  - receive a service discovery record from a source access point (AP) of a plurality of APs deployed in an information technology (IT) infrastructure, wherein the CSDM system is deployed outside the IT infrastructure, and wherein the service discovery record comprises information corresponding to an application server;
  - generate, by the CSDM system, a neighbor AP group corresponding to the application server based on nearness between the source AP and the rest of the plurality of APs, wherein the neighbor AP group comprises a set of neighbor APs identified from the plurality of APs such that an average received signal strength indicator (RSSI) value for wireless signals between each of the set of neighbor APs and the source AP is greater than an RSSI threshold; and
  - transmit the service discovery record to the set of neighbor APs so that the application server is discoverable by a first client device connected to the set of neighbor APs that are part of the neighbor AP group but not discoverable by a second client device connected to one or more APs that are not in neighbor AP group for the application server.

10. The CSDM system of claim 9, wherein the processing resource executes one or more of the instructions to receive the average RSSI value for wireless signals between the source AP and the each of the rest of the plurality of APs, wherein the average RSSI value is indicative of the nearness between the source AP and the rest of the plurality of APs.

11. The CSDM system of claim 10, wherein, for an AP of the plurality of APs, the processing resource executes one or more of the instructions to determine if the average RSSI value of wireless signals between the source AP and the AP is greater than the RSSI threshold.

12. The CSDM system of claim 11, wherein processing resource executes one or more of the instructions to designate the AP as a neighbor AP if the average RSSI value of wireless signals between the source AP and the AP is greater than the RSSI threshold.

13. The CSDM system of claim 11, wherein the processing resource is configured to execute one or more of the instructions to:
- enable a user interface for a user to input the RSSI threshold corresponding to the application server; and
- receive the RSSI threshold corresponding to the application server via the user interface.

14. The CSDM system of claim 11, wherein the application server is configured with Bonjour protocol and is discoverable by client devices configured with Bonjour protocol.

* * * * *